April 5, 1927.	F. W. EMRICK	1,623,172
CHAIN
Filed Dec. 7, 1925
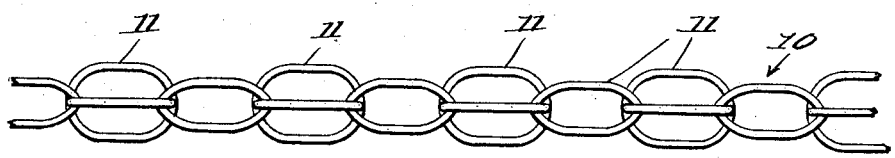
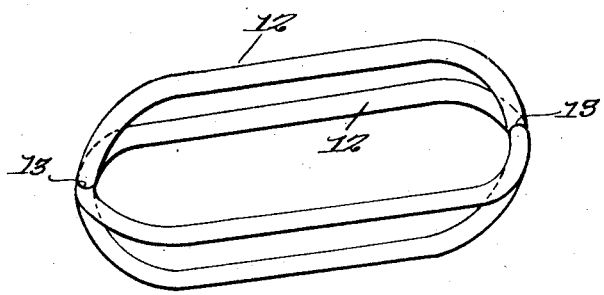
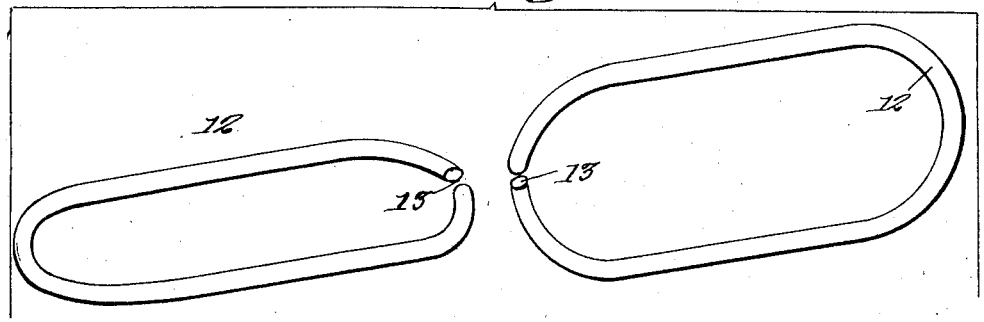
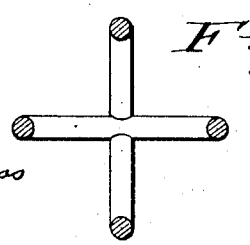
Inventor
F. W. Emrick
By Victor J. Evans
Attorney
R. A. Thomas
Witness Patented Apr. 5, 1927.

1,623,172

UNITED STATES PATENT OFFICE.

FRANK W. EMRICK, OF BUCHANAN, IOWA.

CHAIN.

Application filed December 7, 1925. Serial No. 73,847.

This invention relates to chains adapted for use for a multitude of purposes and has for its object the provision of a chain embodying interconnected links of peculiar formation of such construction or relation of parts as to prevent twisting or kinking under even the most adverse circumstances, the chain being consequently particularly advantageous when employed in connection with hoisting apparatus or the like where it is necessary for the chain to pass over pulleys or through guide devices.

An important object is the provision of a chain in which all the interconnected links are of identical construction, each being formed from a pair of sections joined in a peculiar manner.

An additional object is to provide a chain of this character which will be simple and inexpensive in manufacture, efficient and durable in service and a general improvement in the art.

With the above and other objects and advantages in view, the invention consists in the details of construction, and the arrangement and combination of parts to be hereinafter more fully described and claimed, and illustrated in the accompanying drawings, in which:—

Figure 1 is a side elevation of a length of chain constructed in accordance with the invention.

Figure 2 is a detail perspective view of one link in assembled form.

Figure 3 is a perspective view showing the two elements of a link separated, and Figure 4 is a detail in cross section.

Referring more particularly to the drawings, I have shown, in Figure 1, a length of chain designated broadly by the numeral 10 and formed of a plurality or series of interconnected links 11 of identical construction, of course capable of having relative movement but capable of separation.

Each link is here represented as formed of a pair of elongated loops 12 arranged with their longitudinal axes coincident and their transverse axes at right angles as clearly indicated in Figures 2 and 4. Each loop 12 is formed from a single length of wire, rod or the like and is initially open at one end as indicated at 13 so that when the two loops are brought together in the relation above mentioned the gap or opening 13 in each will engage against opposite sides of the bight portion of the other. The gaps or openings may be welded, brazed or soldered at their ends to the portions of the loop engaged thereby to define the structure particularly well illustrated in Figures 2 and 4 and it is of course apparent that when connection is effected in this manner opening up of the links under ordinary circumstances will be prevented.

Obviously, in constructing the chain, a plurality of the links are arranged with their end portions interlocking as clearly indicated in Figure 1 and owing to the peculiar formation of the individual link it is quite apparent that kinking or twisting will be entirely avoided, thus making the device particularly well suited for many purposes where an ordinary type of chain will be inadequate.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

A chain comprising a plurality of similar connected links, each link being formed of a pair of elongated wire loops lying in planes at right angles to each other, each loop being provided initially with a gap at one end and the loops being arranged with the gap of each engaging upon the bight portion of the other, the loops being secured together at their points of engagement.

In testimony whereof I affix my signature.

FRANK W. EMRICK.